(12) United States Patent
Williamson

(10) Patent No.: US 9,355,383 B2
(45) Date of Patent: May 31, 2016

(54) TRACKING DIFFERENTIAL CHANGES IN CONFORMAL DATA INPUT SETS

(75) Inventor: Eric Williamson, Willow Spring, NC (US)

(73) Assignee: Red Hat, Inc., Raleigh, NC (US)

( * ) Notice: Subject to any disclaimer, the term of this patent is extended or adjusted under 35 U.S.C. 154(b) by 320 days.

(21) Appl. No.: 12/951,937

(22) Filed: Nov. 22, 2010

(65) Prior Publication Data

US 2012/0130979 A1    May 24, 2012

(51) Int. Cl.
*G06F 17/30*    (2006.01)
*G06Q 10/10*    (2012.01)

(52) U.S. Cl.
CPC .......... *G06Q 10/10* (2013.01); *G06F 17/30589* (2013.01); *G06F 17/30923* (2013.01)

(58) Field of Classification Search
CPC ..................... G06F 17/30923; G06F 17/30589
See application file for complete search history.

(56) References Cited

U.S. PATENT DOCUMENTS

| | | | |
|---|---|---|---|
| 5,822,736 A * | 10/1998 | Hartman et al. | ............. 705/20 |
| 5,890,167 A | 3/1999 | Bridge, Jr. et al. | |
| 5,978,796 A | 11/1999 | Malloy et al. | |
| 6,360,188 B1 | 3/2002 | Freidman et al. | |
| 6,366,922 B1 | 4/2002 | Althoff | |
| 6,434,435 B1 | 8/2002 | Tubel et al. | |
| 6,434,544 B1 | 8/2002 | Bakalash et al. | |
| 6,594,672 B1 | 7/2003 | Lampson et al. | |
| 6,609,123 B1 | 8/2003 | Cazemier et al. | |
| 6,735,590 B1 | 5/2004 | Shoup et al. | |
| 6,931,418 B1 | 8/2005 | Barnes | |
| 7,152,062 B1 | 12/2006 | Draper et al. | |
| 7,299,241 B2 | 11/2007 | Reed et al. | |
| 7,660,822 B1 | 2/2010 | Pfleger | |
| 7,707,169 B2 * | 4/2010 | Comaniciu et al. | ........... 707/602 |
| 2001/0049678 A1 | 12/2001 | Yaginuma | |
| 2002/0029207 A1 | 3/2002 | Bakalash et al. | |
| 2002/0035562 A1 | 3/2002 | Roller et al. | |
| 2002/0083034 A1 | 6/2002 | Orbanes et al. | |
| 2002/0087516 A1 | 7/2002 | Cras et al. | |
| 2002/0169658 A1 | 11/2002 | Adler | |
| 2003/0114950 A1 | 6/2003 | Ruth et al. | |
| 2003/0115194 A1 | 6/2003 | Pitts et al. | |

(Continued)

OTHER PUBLICATIONS

Using OLAP and Multi-Dimensional data for decision making, Hasan et al. IEEE 2001.

(Continued)

*Primary Examiner* — Usmaan Saeed
*Assistant Examiner* — Paul Kim
(74) *Attorney, Agent, or Firm* — Lowenstein Sandler LLP

(57) ABSTRACT

Embodiments relate to systems and methods for tracking differential changes in conformal data input sets. A database can store sets of operational data, such as financial, medical, climate or other information. For given data, a portion of the input data can be known or predetermined, while for a second portion can be unknown and subject to interpolation. The interpolation engine can generate a conformal interpolation function and interpolated input sets that map to a set of target output data. The operator can access a view of known (or interpolated) input data to view one or more series of interpolated input data, and analyze the differential between those interpolated values. The operator can for instance apply a constraint or filter to view only those interpolated series whose maximum marginal difference for any variable is less that a given threshold, such as ten percent, and graphically navigate between different series.

20 Claims, 8 Drawing Sheets

(56) References Cited

U.S. PATENT DOCUMENTS

| | | |
|---|---|---|
| 2003/0115207 A1 | 6/2003 | Bowman et al. |
| 2003/0120372 A1 | 6/2003 | Ruth et al. |
| 2003/0126114 A1 | 7/2003 | Tedesco |
| 2003/0130983 A1* | 7/2003 | Rebane .......................... 707/1 |
| 2003/0184585 A1 | 10/2003 | Lin et al. |
| 2003/0225736 A1 | 12/2003 | Bakalash et al. |
| 2004/0039736 A1 | 2/2004 | Kilmer et al. |
| 2004/0133552 A1 | 7/2004 | Greenfield et al. |
| 2004/0139061 A1 | 7/2004 | Colossi et al. |
| 2005/0004904 A1 | 1/2005 | Kearney et al. |
| 2005/0010566 A1 | 1/2005 | Cushing et al. |
| 2005/0060382 A1 | 3/2005 | Spector et al. |
| 2006/0004833 A1 | 1/2006 | Trivedi et al. |
| 2006/0036707 A1 | 2/2006 | Singh et al. |
| 2006/0136462 A1 | 6/2006 | Campos et al. |
| 2006/0262145 A1 | 11/2006 | Zhang et al. |
| 2007/0022093 A1 | 1/2007 | Wyatt et al. |
| 2007/0027904 A1 | 2/2007 | Chow et al. |
| 2007/0088757 A1 | 4/2007 | Mullins et al. |
| 2007/0094236 A1 | 4/2007 | Otter et al. |
| 2007/0208721 A1 | 9/2007 | Zaman et al. |
| 2008/0140696 A1 | 6/2008 | Mathuria |
| 2008/0172405 A1 | 7/2008 | Feng et al. |
| 2008/0243778 A1 | 10/2008 | Behnen et al. |
| 2008/0294596 A1 | 11/2008 | Xiong |
| 2008/0320023 A1 | 12/2008 | Fong |
| 2009/0193039 A1 | 7/2009 | Bradley et al. |
| 2009/0222470 A1 | 9/2009 | Kemp et al. |
| 2010/0057700 A1 | 3/2010 | Williamson |
| 2010/0057777 A1 | 3/2010 | Williamson |
| 2010/0131456 A1 | 5/2010 | Williamson |
| 2010/0169299 A1 | 7/2010 | Pollara |
| 2010/0305922 A1 | 12/2010 | Williamson |
| 2010/0306254 A1 | 12/2010 | Williamson |
| 2010/0306255 A1 | 12/2010 | Williamson |
| 2010/0306272 A1 | 12/2010 | Williamson |
| 2010/0306281 A1 | 12/2010 | Williamson |
| 2010/0306340 A1 | 12/2010 | Williamson |
| 2010/0306682 A1 | 12/2010 | Williamson |
| 2011/0050728 A1 | 3/2011 | Williamson |
| 2011/0054854 A1 | 3/2011 | Williamson |
| 2011/0055680 A1 | 3/2011 | Williamson |
| 2011/0055761 A1 | 3/2011 | Williamson |
| 2011/0055850 A1 | 3/2011 | Williamson |
| 2011/0078199 A1 | 3/2011 | Williamson |
| 2011/0078200 A1 | 3/2011 | Williamson |
| 2011/0131176 A1 | 6/2011 | Williamson |
| 2011/0131220 A1 | 6/2011 | Williamson |
| 2011/0158106 A1 | 6/2011 | Williamson |
| 2011/0161282 A1 | 6/2011 | Williamson |
| 2011/0161374 A1 | 6/2011 | Williamson |
| 2011/0161378 A1 | 6/2011 | Williamson |

OTHER PUBLICATIONS

A new OLAP aggregation based on the AHC technique, Massaoud et al, DOLAP'04 Nov. 12-13, 2004.

Interactive hierarchical dimension ordering, spacing and filtering for exploration of high dimension datasets, Yang et al, IEEE symposium on information visualization 2003.

Williamson, "Systems and Methods for Interpolating Conformal Input Sets Based on a Target Output", U.S. Appl. No. 12/872,779, filed Aug. 31, 2010.

Williamson, "Systems and Methods for Interpolating Alternative Input Sets Based on User-Weighted Variables", U.S. Appl. No. 12/951,881, filed Nov. 22, 2010.

Williamson, "Systems and Methods for Validating Interpolation Resulsts Using Monte Carlo Simulations on Interpolated Data Inputs", U.S. Appl. No. 13/037,344, filed Feb. 28, 2011.

Williamson, "Systems and Methods for Training a Self-Learning Network Using Interpolated Input Sets Based on a Target Output", U.S. Appl. No. 12/872,935, filed Aug. 31, 2010.

Williamson, "Systems and Methods for Embedding Interpolated Data Object in Application Data File", U.S. Appl. No. 12/955,717, filed Nov. 29, 2010.

Williamson, "Systems and Methods for Generating Interpolated Input Data Sets Using Reduced Input Source Objects", U.S. Appl. No. 12/955,768, filed Nov. 29, 2010.

Williamson, "Systems and Methods for Filtering Interpolated Input Data Based on User-Supplied or Other Approximation Constraints", U.S. Appl. No. 12/955,790, filed Nov. 29, 2010.

Williamson, "Systems and Methods for Binding Multiple Interpolated Data Objects", U.S. Appl. No. 12/955,811, filed Nov. 29, 2010.

Williamson, "Systems and Methods for Generating Portable Interpolated Data Using Object Based Encodig of Interpolated Results", U.S. Appl. No. 13/037,322, filed Feb. 28, 2011.

Williamson, "Systems and Methods for Generating Interpolation Data Template to Normalize Analytic Runs", U.S. Appl. No. 13/037,332, filed Feb. 28, 2011.

Williamson, "Systems and Methods for Generating Interpolation Data Sets Converging to Optimized Results Using Iterative Overlapping Inputs", U.S. Appl. No. 13/037,341, filed Feb. 28, 2011.

ASPFAQ.com, "What are the valid styles for converting datetime to string?", (2006) http://database.aspfaq.com/database/what-are-the-valid-styles-for-converting-datetime-to-string.html.

Answering Joint Queries from Multiple Aggregate OLAP Databases, Pourabbas et al, LNCS 2737, pp. 24-34, 2003.

\* cited by examiner

TRACKING DIFFERENTIAL CHANGES IN CONFORMAL DATA INPUT SETS

FIELD

The invention relates generally to systems and methods for tracking differential changes in conformal data input sets, and more particularly, to platforms and techniques for accessing sets of series of interpolated data, analyzing and navigating differential pathways in that data, and selecting preferred or maximized series that meet user-supplied criteria.

BACKGROUND

In the fields of computational modeling and high performance computing, modeling platforms are known which contain a modeling engine to receive a variety of modeling inputs, and then generate a precise modeled output based on those inputs. In conventional modeling platforms, the set of inputs are precisely known, and the function applied to the modeling inputs is precisely known, but the ultimate results produced by the modeling engine are not known until the input data is supplied and the modeling engine is run. For example, in an econometric modeling platform, inputs for a particular industry like housing can be fed into a modeling engine. Those inputs can include, for instance, prevailing finance rates, employment rates, average new-home costs, costs of building materials, rate of inflation, and other economic or other variables that can be fed into the modeling engine which is programmed or configured to accept those inputs, apply a function or other processing to those inputs, and generate an output such as projected new-home sales for a given period of time. Those results can then be used to analyze or forecast other details related to the subject industry, such as predicted sector profits or employment.

In many real-life analytic applications, however, the necessary inputs for a given subject or study may not be known, while, at the same time, a desired or target output may be known or estimated with some accuracy. For instance, the research and development (R&D) department of a given corporation may be fixed at the beginning of a year or other budget cycle, but the assignment or allocation of that available amount of funds to different research teams or product areas may not be specified by managers or others. In such a case, an analyst may have to manually estimate and "back out" distributions of budget funds to different departments to begin to work out a set of component funding amounts that will, when combined, produce the already-known overall R&D or other budget. In performing that interpolation, the analyst may or may not be in possession of some departmental component budgets which have themselves also been fixed, or may or may not be in possession of the computation function which will appropriately sum or combine all component funds to produce the overall predetermined target budget. Adjustment of one component amount by hand may cause or suggest changes in other components in a ripple effect, which the analyst will then have to examine or account for in a further iteration of the same manual estimates.

In cases where an interpolation study is conducted and a collection of series of interpolated is generated, the analyst or other operator may be presented with a choice or decision between different alternative series that produce a desired output. For instance, a manufacturer may conduct a study or analysis to determine various combinations of chemical ingredients that may produce a given grade of industrial solvent at a selected price point. The analysis may not, however, provide the user with insight regarding which components may be most dramatically changed between different formulations, so that the chemical properties of the desired product can be effectively tracked or estimated. In such a scenario or others, the manufacturer or producer may wish to limit the change in ingredient X to be no more than 10% of ingredient Y, regardless of the eventual total complement of ingredients. Other situations may require or benefit from differential analytics.

It may be desirable to provide systems and methods for tracking differential changes in conformal data input sets, in which the user of an interpolation tool can generate and navigate various alternative series of data based on a set of differential criteria.

DESCRIPTION

Figure 1:
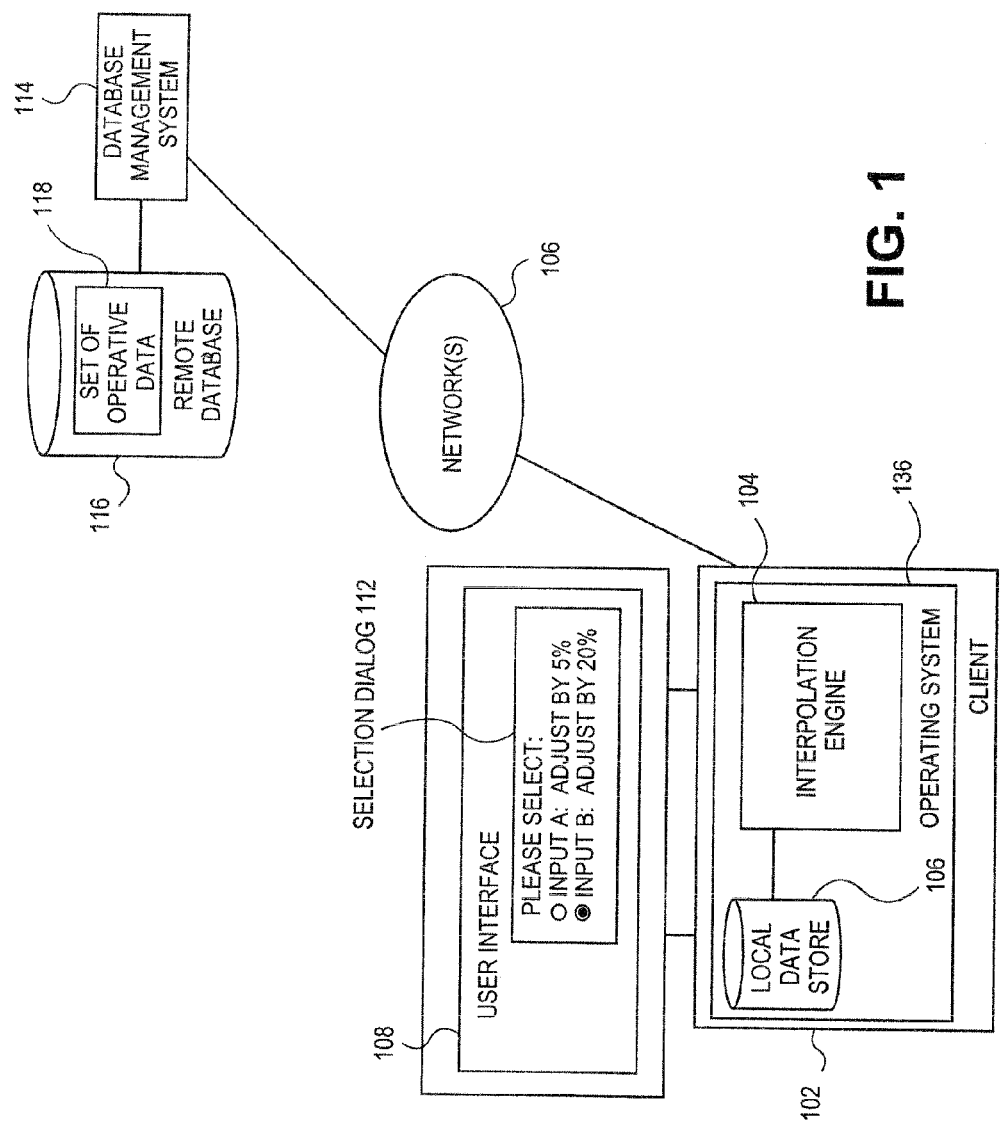
FIG. 1 illustrates an overall network architecture which can support the generation of interpolated input sets based on a target output, according to various embodiments of the present teachings.

Embodiments relate to systems and methods for tracking differential changes in conformal data input sets. More particularly, embodiments relate to platforms and techniques to permit a user to access and extract two or more series of interpolated input data, input or supply differential criteria by which to compare or analyze those series, and navigate between the series to test, observe, and explore the marginal variations between the series and/or their corresponding outputs. In terms of the interpolated data which the weighting module, tool, or logic can access and operated on, that underlying data can be generated by one or more underlying interpolation platforms which access or retrieve a set of historical, operational, archival, or other operative data related to captured technical, financial, medical, or other operations, and supply that operative data to an interpolation engine. The interpolation engine can also be supplied with or can access a set of target output data, for purposes of generating a set of estimated, approximated, inferred, or otherwise interpolated inputs that can be supplied to the interpolation engine to produce the target output. Thus, for instance, in an illustrative context of a climate modeling platform, a collection or set of historical input data, such as ocean temperatures, air temperatures, land temperatures, average wind speed and direction, average cloud cover, and/or other inputs or factors can be accessed or retrieved from a data store. The data store can for the interpolation platform can for instance include records of those or other variables for each year of the last ten years, along with an output or result associated with those inputs, such as ocean level or polar cap area for each of those years or other series. In aspects, a partial set or subset of predetermined or fixed values for the same inputs can be supplied to the interpolation engine, such as predicted or assumed arctic temperatures, for the current year. The interpolation engine can also receive a set of target output data, such as the expected or projected ocean level or polar cap area for the current year. According to embodiments, the interpolation engine can then generate an interpolation function, and generate a set of interpolated inputs, such as air temperature, land temperature, average wind speed and direction, average cloud cover, and/or other remaining inputs whose values are unspecified, but which can be interpolated to produce values which when supplied as input to the interpolation engine can produce the set of target output data.

In cases, an analyst, operator, and/or other user may wish to generate and explore variations in the historical input data and/or the interpolated portions of that data, or possibly of the output data. In such scenarios, a user can invoke a navigation dialog hosted in or run by the interpolation engine and/or associated weighting tool, in order to access different views, comparisons, pages, trees, lists, graphs, and/or other data or presentations of series of data to observe, analyze, and operate on the different values and/or outputs associated with or produced by different series of data. In aspects, the different series can represent or reflect alternative scenarios or outcomes in a phenomena or operation under study. The user can supply differential criteria to filter, restrict, or control the different series or other data sets to be explored, as well as to highlight marginal changes in individual variables contained in series and the effects of those changes on outputs or other quantities.

In cases, the interpolation engine and/or other logic can generate different combinations of the set of interpolated input data in different generations, series, and/or other alternative values or groupings, to permit an analyst or other user to manipulate the input values, to observe different ramifications of selecting or modifying different sets of interpolated inputs and/or other components of the data. The user can be presented with the navigation dialog or other interface to specify differential criteria, and extract those series of data which meet preferred ranges or margins. The interpolation logic can generate a set of differential changes between different series of input data, including interpolated data. The analyst or other user can thereby examine scenarios including alternative materials, costs, and/or other inputs, to determine for instance whether the known output data can be maintained or maintained within desired ranges under different conditions, based on the observed set of differential changes.

After completion of those or other types of interpolation studies or reports, according to the present teachings, the set of differential changes and other data can be stored to a local or remote data store. According to embodiments of the present teachings, that data can then be accessed or retrieved by the same interpolation platform or engine and/or other tools or users, for instance to perform further interpolation or modeling activity consistent with the set of series of interpolated values and target output data.

Consistent with the foregoing, in embodiments as shown in FIG. 1, in accordance with embodiments of the invention, a user can operate a client 102 which is configured to host an interpolation engine 104, to perform interpolation and other analytic operations as described herein. In aspects, while embodiments are described in which interpolation engine 104 is described to operate on historical data to interpolate or fill in missing values or parameters, in embodiments, it will be understood that interpolation engine 104 can in addition or instead operate to produce extrapolated data, reflecting expected future values of inputs and/or outputs. In aspects, the client 102 can be or include a personal computer such as a desktop or laptop computer, a network-enabled cellular telephone, a network-enabled media player, a personal digital assistant, and/or other machine, platform, computer, and/or device. In aspects, the client 102 can be or include a virtual machine, such as an instance of a virtual computer hosted in a cloud computing environment. In embodiments as shown, the client 102 can host or operate an operating system 136, and can host or access a local data store 106, such as a local hard disk, optical or solid state disk, and/or other storage. The client 102 can generate and present a user interface 108 to an analyst or other user of the client 102, which can be a graphical user interface hosted or presented by the operating system 136. In aspects, the interpolation engine 104 can generate a selection dialog 112 to the user via the user interface 108, to present the user with information and selections related to interpolation and other analytic operations.

In embodiments as likewise shown, the client 102 and/or interpolation engine 104 can communicate with a remote database management system 114 via one or more networks 106. The one or more networks 106 can be or include the Internet, and/or other public or private networks. The database management system 114 can host, access, and/or be associated with a remote database 116 which hosts a set of operative data 118. In aspects, the database management system 114 and/or remote database 118 can be or include remote database platforms such the commercially available Oracle™ database, an SQL (structured query language) database, an XML (extensible markup language) database, and/or other storage and data management platforms or services. In embodiments, the connection between client 102 and/or the interpolation engine 104 and the database management system 114 and associated remote database 116 can be a secure connection, such as an SSL (secure socket layer) connection, and/or other connection or channel. The interpolation engine 104 can access the set of operative data 118 via the database management system 114 and/or the remote database 116 to operate, analyze, interpolate and map the set of operative data 118 and other data sets to produce or conform to a set of target output data 120. In aspects, the predetermined or already-known set of target output data 120 can be stored in set of operative data 118, can be received as input from the user via selection dialog 112, and/or can be accessed or retrieved from other sources.

Figure 2A:
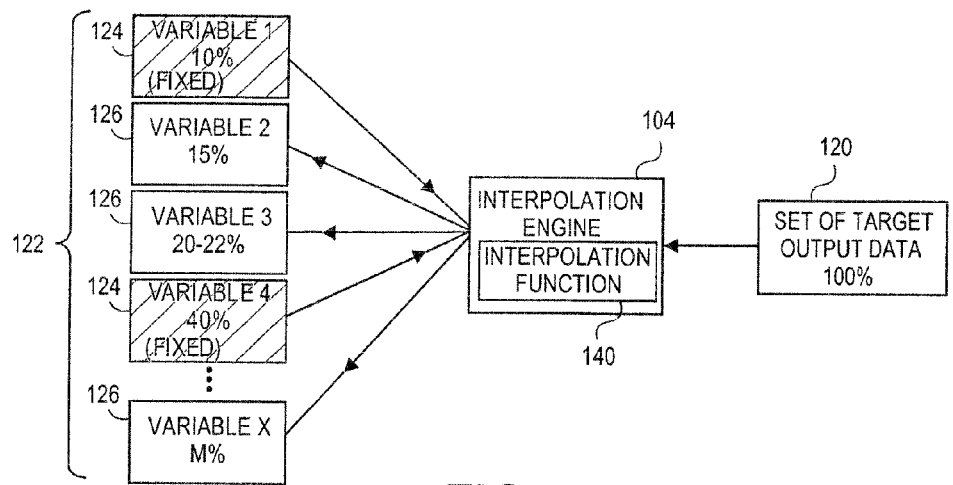
FIGS. 2A-2B illustrate various exemplary sets of input data, and series of sets of input data, that can be produced by interpolation techniques whose output and other data can be used in systems and methods for tracking differential changes in conformal data input sets, according to various embodiments.
Figure 2B:
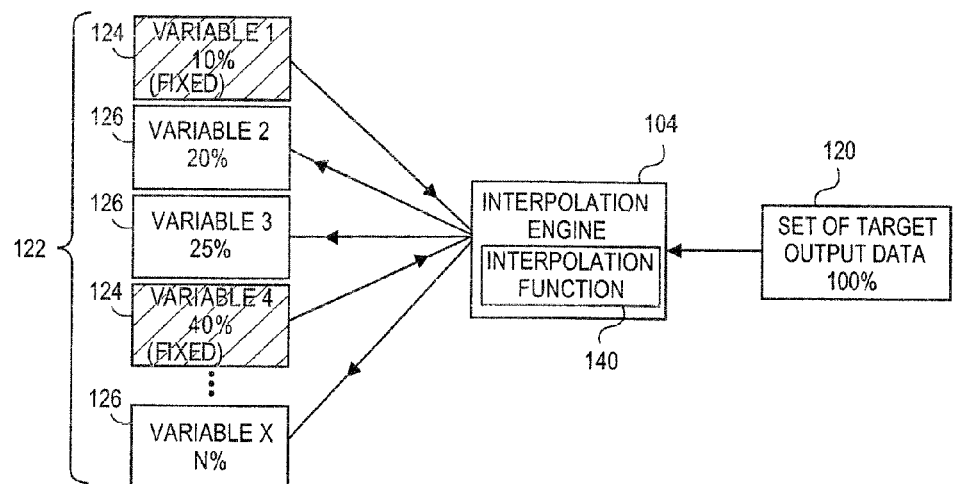

In embodiments, and as shown in FIGS. 2A-2B, the interpolation engine 104 can, in general, receive the set of target output data 120, and operate on that data to produce a conformal mapping of a set of combined input data 122 to generate an output of the desired set of target output data. As for instance shown in FIG. 2A, the set of combined input data 122 can, in cases, comprise at least two component input data sets or subsets. In aspects as shown, the set of combined input data 122 can comprise or contain a set of predetermined input data 124. The set of predetermined input data 124 can consist of data that is predetermined or already known or captured, for instance by accessing the set of operative data 118, and/or by receiving that data from the user as input via the selection dialog 112. In aspects, the set of predetermined input data 124 can include variables or other data which are already known to the user, to other parties, or has already been fixed or captured. In the case of a medical epidemiology study, for example, the set of predetermined input data 124 can include the number of vaccination doses available to treat an influenza or other infectious agent. For further example, in cases where the set of combined input data 122 represents the components of a corporate or government financial budget, the set of predetermined input data 124 can reflect the percentages (as for instance shown), for example to be allocated to different departments or agencies. It will be appreciated that other percentages, contributions, expressions, and/or scenarios or applications can be used.

In aspects, the interpolation engine 104 can access and process the set of predetermined input data 124 and the set of target output data 120, to generate a set of interpolated input data 126 which can produce the set of target output data 120 via an interpolation function 104. For instance, if the set of target output data 120 represents a total budget amount for an entity, then the set of interpolated input data 126 can reflect possible, approximate, or suggested values or percentages of that total funded amount that the interpolation engine 104 can allocate to various departments, using the interpolation function 140. Again, as noted the interpolation function 140 can be determined by interpolation engine 104 to generate the set of target output data 120, as predetermined by the user or otherwise known or fixed. In embodiments, interpolation techniques, functions, and/or other related processing as described in co-pending U.S. application Ser. No. 12/872,779, entitled "Systems and Methods for Interpolating Conformal Input Sets Based on a Target Output," filed on Aug. 31, 2010, having the same inventor as this application, assigned or under obligation of assignment to the same entity as this application, and incorporated by reference in its entirety herein, can be used in determining interpolation function 140, configuring and/or executing interpolation engine 104, and/or performing other related operations. In aspects, the interpolation engine 104 can also comprise, host, generate, present, and/or access a navigation dialog 180 which may be used to present menus, options, lists, and/or other selection choices, gadgets, and/or other interfaces to receive user inputs, data values, functions, selections, and/or other adjustments or manipulations to the set of predetermined input data 124, the set of interpolated input data 126, and/or other data components, to generate or select different or alternative data series for comparative examination or other purposes, as described herein.

The following applications, scenarios, applications, or illustrative studies will illustrate the interpolation action or activity that may be performed by the interpolation engine 104, according to various embodiments. In cases, again merely for illustration of exemplary interpolation analytics, the set of operative data 118 can be or include data related to medical studies or information. Thus for instance, the set of operative data 118 can include data for a set or group of years that relate to public health issues or events, such as the population-based course of the influenza seasons over that interval. The set of operative data can include variables or inputs that were captured or tracked for the influenza infection rate in the population for each year over the given window. Those variables or inputs can be or include, for instance, the percentage of the population receiving a public vaccine by Week 10 of the flu season, e.g. 20%, the age cohorts of the patients receiving the vaccine, the strain of the influenza virus upon which the vaccine is based, e.g. H5N5, the infectivity or transmission rate for a given infected individual, e.g. 3%, the average length of infectious illness for the infected population, e.g. 10 days, and/or other variables, metrics, data or inputs related to the epidemiology of the study. In aspects, the output or result of those tracked variables can be the overall infection rate for the total population at peak or at a given week or other time point, such as 40%. Other outputs or results can be selected. Those inputs and output(s) can be recorded in the set of operative data 118 for a set or group of years, such as for each year of 2000-2009, or other periods. In aspects, data so constituted can be accessed and analyzed, to generate interpolated data for current year 2010, although the comparable current inputs are not known or yet collected. In the current year (assumed to be 2010), one or more of the set of predetermined variables 124 may be known, such as, for instance, the vaccination rate of because yearly stocks are known or can be reliably projected, e.g. at 25%. In addition, an analyst or other user may specify a set of target output data 120 that can include the overall infection rate for the population the year under study, such as 35% at peak. In cases of this illustrative type, the interpolation engine 104 can access or receive the overall infection rate (35% peak) as the set of predetermined output data 120 or a part of that data, as well as the vaccination rate (25%) as the set of predetermined input data 124 or part of that data. In aspects, the interpolation engine 104 can access the collected historical data (for years 2000-2009) to analyze that data, and generate an interpolation function 140 which operates on the recorded inputs to produce the historical outputs (overall infection rate), for those prior years, either to exact precision, approximate precision, and/or to within specified margins or tolerance. The interpolation engine 104 can then access or receive the set of target output data 120 for the current (2010) year (35% peak infection), the set of predetermined input data (25% vaccination rate), and/or other variables or data, and utilize the interpolation function 140 to generate the set of interpolated input data 126. In the described scenario, the set of interpolated input data 126 generated or produced by the interpolation engine 104 can include the remaining unknown, speculative, uncollected, or otherwise unspecified inputs, such as the percentage of the population receiving a public vaccine by Week 10 of the flu season, e.g. 25%, the age cohorts of the patients receiving the vaccine, the strain of the influenza virus upon which the vaccine is based, e.g. H1N5, the infectivity or transmission rate for a given infected individual, e.g. 4%, the average length of infectious illness for the infected population, e.g. 9 days, and/or other variables, metrics, data or inputs. In aspects, the interpolation engine 104 can generate or decompose the set of interpolated input data 126 to produce the set of target output data 120 (here 35% peak infection) to exact or arbitrary precision, and/or to within a specified margin or tolerate, such as 1%. Other inputs, outputs, applications, data, ratios and functions can be used or analyzed using the systems and techniques of the present teachings.

In embodiments, as noted the interpolation function 140 can be generated by the interpolation engine 104 by examining the same or similar variables present in the set of operative data 118, for instance, medical data as described, or the total fiscal data for a government agency or corporation for a prior year or years. In such cases, the interpolation engine 104 can generate the interpolation function 140 by assigning the same or similar categories of variables a similar value as the average of prior years or sets of values for those same variables, and then perform an analytic process of those inputs to derive set of target output data 120 as currently presented. The interpolation engine 104 can, for example, apply a random perturbation analysis to the same variables from prior years, to produce deviations in amount for each input whose value is unknown and desired to be interpolated. When combinations of the set of predetermined input data 124 and set of interpolated input data 126 are found which produce the set of target output data 120, or an output within a selected margin of set of target output data 120, the user can operate the selection dialog 112 or otherwise respond to accept or fix those recommended or generated values.

In cases, and as for instance illustrated in FIG. 2B, the set of combined input data 122 can be generated to produce the set of target output data 120 may not be unique, as different combinations of the set of predetermined input data 124 and set of interpolated input data 126 can be discovered to produce the set of target output data 120 either exactly, or to within specified tolerance. In such cases, different versions, generations, and/or series of set of combined input data 122 can be generated that will produce the set of target output data 120 to equal or approximately equal tolerance. For example, in cases where the set of operative data 118 relates to an epidemiological study, it may be found that a limit of 20 million cases of new infection during a flu season can be produced as the set of target output data 120 by applying 40 million doses of vaccine at week 6 of the influenza season, or can be produced as a limit by applying 70 million doses of vaccine at week 12 of the same influenza season. Other variables, operative data, ratios, balances, interpolated inputs, and outputs can be used or discovered. In embodiments, when the possible conformal set of interpolated inputs 126 is not unique, the interpolation engine 104 can generate a set of interpolated input series, each series containing a set of interpolated input data 126 which is different and contains potentially different interpolated inputs from other conformal data sets in the set of interpolated input series. In cases where such alternatives exist, the interpolation engine 104 can generate and present the set of interpolated input series, for instance, in series-by-series graphical representations or otherwise, to select, compare, and/or manipulate the results and values of those respective data sets. In embodiments, the analyst or other user may be given a selection or opportunity to choose one set of interpolated input data 126 out of the set of interpolated input series for use in their intended application, or can, in embodiments, be presented with options to continue to analyze and interpolate the set of operative data 118, for example to generate new series in the set of interpolated input series. Other processing options, stages, and outcome selections are possible.

Figure 3:
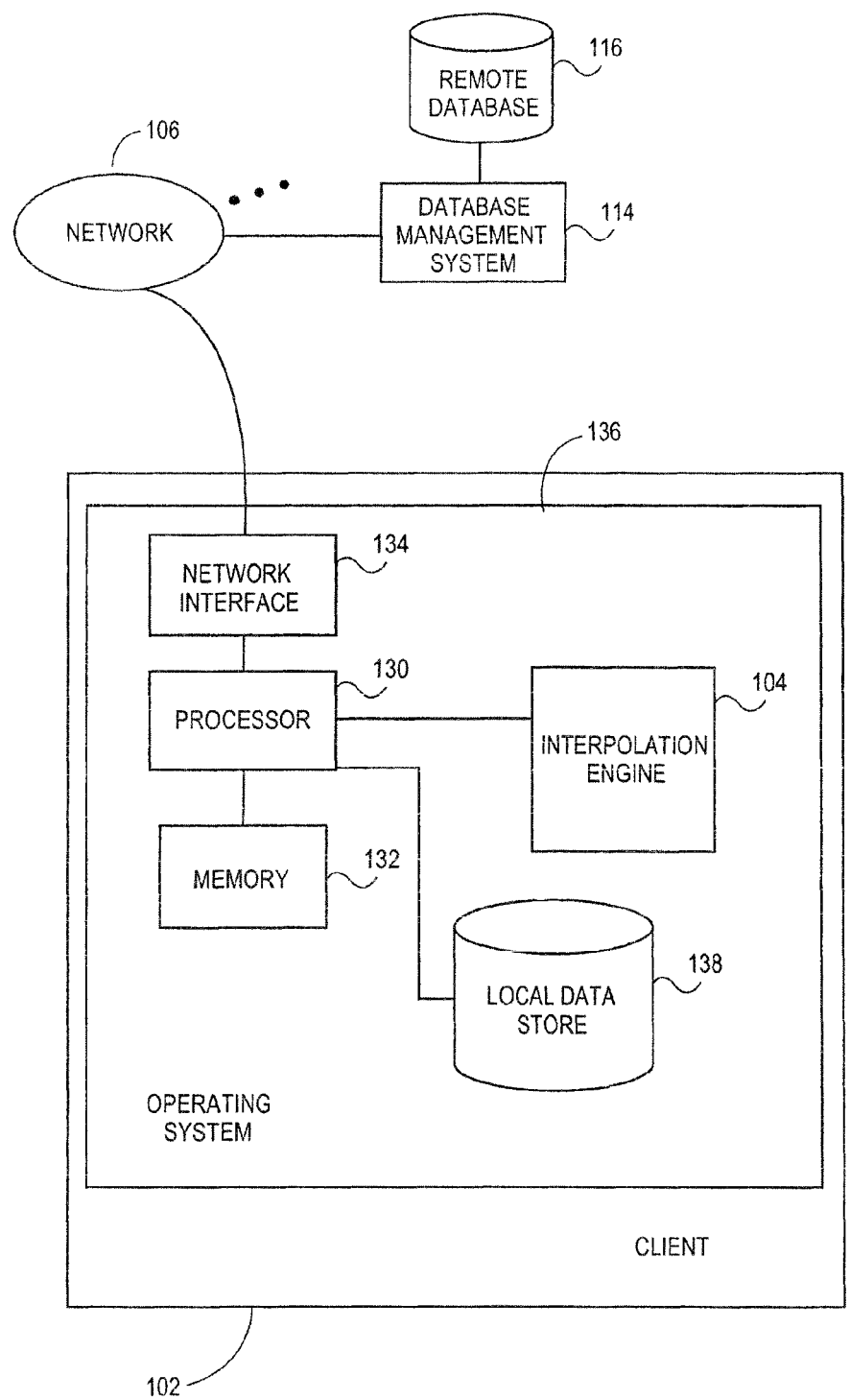
FIG. 3 illustrates an exemplary hardware configuration for client machine which can host or access interpolation processes whose output and related data can be used in systems and methods for tracking differential changes in conformal data input sets, according to various embodiments.

FIG. 3 illustrates an exemplary diagram of hardware and other resources that can be incorporated in a client 102 that can host interpolation engine 104, navigation dialog 180, and/or other logic or resources, and/or otherwise be used in connection with systems and methods for tracking differential changes in conformal data input sets, according to embodiments. In aspects, the client 102 can be or include a personal computer, a network enabled cellular telephone, or other networked computer, machine, or device. In embodiments as shown, the client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 can also communicate with the interpolation engine 104 and/or a local data store 138, such as a database stored on a local hard drive. Processor 130 further communicates with network interface 134, such as an Ethernet or wireless data connection, which in turn communicates with one or more networks 106, such as the Internet or other public or private networks. Processor 130 also communicates with database management system 114 and/or remote database 116, such as an Oracle™ or other database system or platform, to access set of operative data 118 and/or other data stores or information. Other configurations of client 102, associated network connections, storage, and other hardware and software resources are possible. In aspects, the database management system 114 and/or other platforms can be or include a computer system comprising the same or similar components as the client 102, or can comprise different hardware and software resources.

Figure 4:
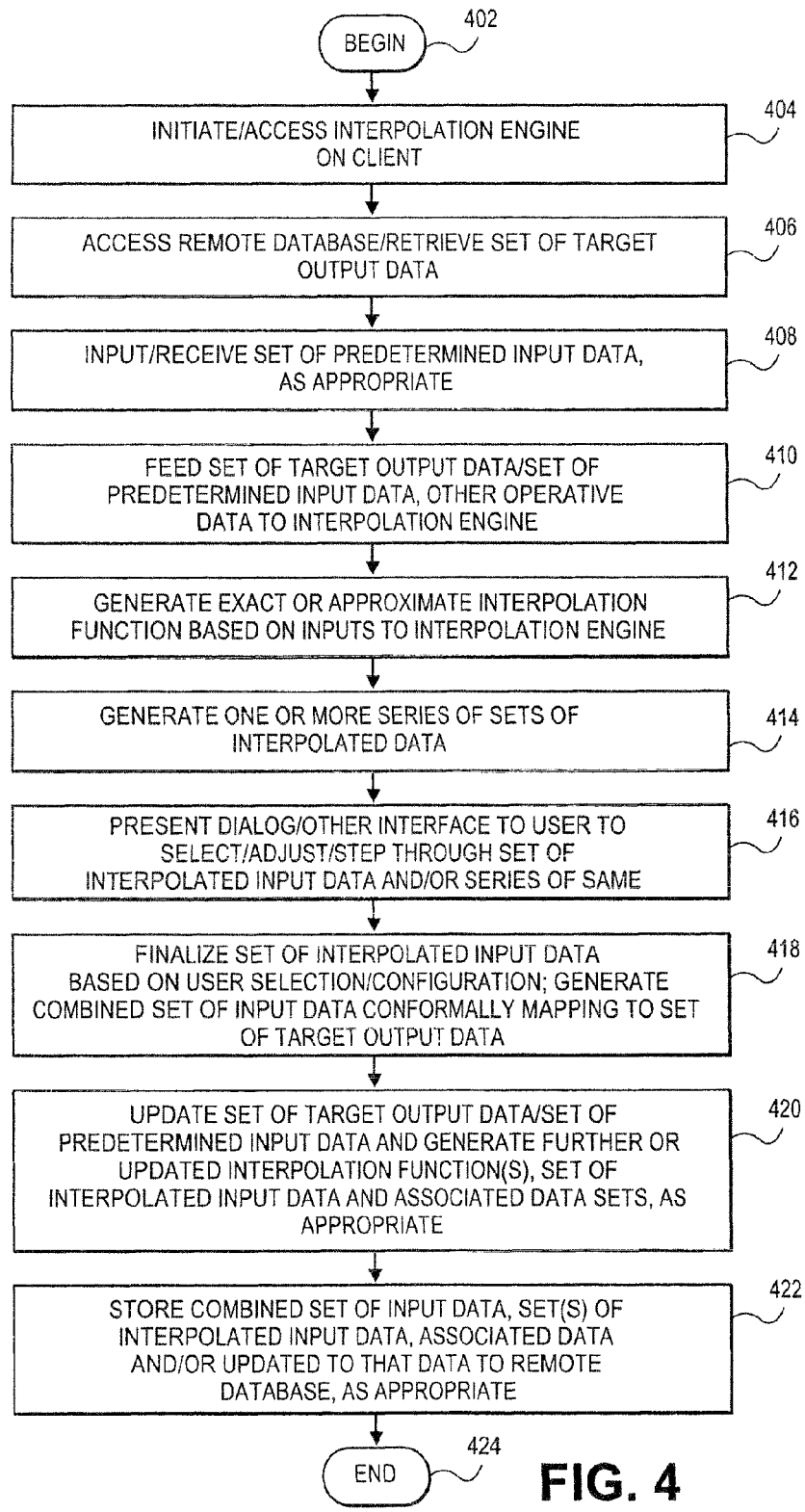
FIG. 4 illustrates a flowchart for overall interpolation, function determination, and other processing that can be used to produce conformal input sets based on a target output that can be used in systems and methods for tracking differential changes in conformal data input sets, according to various embodiments.

FIG. 4 illustrates a flowchart of overall processing to generate interpolation functions, sets of interpolated data, and other reports or information, according to various embodiments of the present teachings. In 402, processing can begin. In 404, a user can initiate and/or access the interpolation engine 104 on client 102, and/or through other devices, hardware, or services. In 406, the user can access the remote database 116 via the database management system 114 and retrieve the set of target output data 120 and/or other associated data or information. In 408, the interpolation engine 104 can input or receive the set of predetermined input data 124, as appropriate. In embodiments, the set of predetermined input data 124 can be received via a selection dialog 112 from the user or operator of client 102. In embodiments, the set of predetermined input data 124 can in addition or instead be retrieved from the set of operative data 116 stored in remote database 116, and/or other local or remote storage or sources. In aspects, the set of predetermined input data 124 can be or include data that is already known or predetermined, which has a precise target value, or whose value is otherwise fixed. For instance, in cases where the set of operative data 118 relates to an undersea oil reserve in a hydrology study, the total volume of oil stored in a reservoir can be known or fixed, and supplied as part of the set of predetermined input data 124 by the user or by retrieval from a local or remote database. In 410, the set of target output data 120, the set of predetermined input data 124, and/or other data in set of operative data 118 or other associated data can be fed to interpolation engine 104.

In 412, the interpolation engine 104 can generate the interpolation function 140 as an exact or approximate function that will generate output conforming to the set of target output data 120, as an output. In aspects, the interpolation function 140 can be generated using techniques such as, for instance, perturbation analysis, curve fitting analysis, other statistical analysis, linear programming, and/or other analytic techniques. In aspects, the interpolation function 140 can be generated to produce an approximation to the set of target output data 120, or can be generated to generate an approximation to set of target output data 120 to within an arbitrary or specified tolerance. The interpolation function 140 can also, in aspects, be generated to produce set of target output data 120 with the highest degree of available accuracy. In 414, the interpolation engine 104 can generate one or more subsets of interpolated input data 126, and/or one or more set of interpolated input series 128 containing individual different combinations of subsets of interpolated input data 126. In aspects, the set of interpolated input data 126 and/or the set of interpolated input series 128 can be generated by applying the set of target output data 120 to the set of predetermined input data 124 and filling in values in the set of interpolated input data 126 which produce an output which conforms to the set of target output data 120, exactly or to within a specified tolerance range. In aspects, the set of interpolated input data 126 and/or the set of interpolated input series 128 can be generated by producing sets of possible interpolated inputs which are then presented to the user via the selection dialog 112, for instance to permit the user to accept, decline, or modify the values of set of interpolated input data 126 and/or the set of interpolated input series 128.

In 416, the interpolation engine 104 can present the selection dialog 112 to the user to select, adjust, step through, and/or otherwise manipulate the set of interpolated input data 126 and/or the set of interpolated input series 128, for instance to allow the user to view the effects or changing different interpolated input values in those data sets. For example, in a case where the set of operative data 118 relates to financial budgets for a corporation, the user may be permitted to manipulate the selection dialog 112 to reduce the funded budget amount for one department, resulting in or allowing an increase in the budget amounts for a second department or to permit greater investment in IT (information technology) upgrades in a third department. In aspects, the selection dialog 112 can permit the adjustment of the set of interpolated input data 126 and/or of interpolated input series 128 through different interface mechanisms, such as slider tools to slide the value of different interpolated inputs through desired ranges. In 418, the user can finalize the set of interpolated input data 126, and the interpolation engine 104 can generate the resulting combined set of input data 122 which conformally maps to the set of target output data 120. In 420, the set of target output data 120, set of predetermined input data 124, and/or other information related to the set of operational data 116 and the analytic systems or phenomena being analyzed can be updated. The interpolation engine 104 and/or other logic can generate a further or updated interpolation function 140, a further or updated set of interpolated input data 126, and/or an update to other associated data sets in response to any such update to the set of target output data 120 and/or set of predetermined input data 124, as appropriate. In 422, the combined set of input data 122, the set of interpolated input data 126, the set of interpolated input series 128, the interpolation function 140, and/or associated data or information can be stored to the set of operative data 118 in the remote database 116, and/or to other local or remote storage. In 424, as understood by persons skilled in the art, processing can repeat, return to a prior processing point, jump to a further processing point, or end.

According to embodiments of the present teachings, the set of combined input data 122 including the set of predetermined input data 124, the set of interpolated input data 126, as well as the set of target output data 120 and/or other information generated by the interpolation engine 104 and/or other logic can be analyzed according to a set of differential criteria to track, identify, navigate, and/or manage potential alternative data sets in the set of combined input data 122. Thus for example, if one or more series of set of interpolated input data 126 represent a possible solution to an engineering, medical, financial, and/or other scenario, the analyst or other user may wish to view the differential changes between any two or more of those series to explore which series tend to deviate, conform, and/or otherwise compare to other series. In cases, series which exhibit a relatively close correspondence to other series, such as known reference or "good" series, may for instance be identified for selection or incorporate into additional data sets or studies. Conversely, in cases, series which demonstrate a strong deviation from the averages and/or other metrics of other series may be identified as being of interest, due to the presence of anomalies in the predetermined output whose cause is being examined. For those and other reasons, an analyst, operator, and/or other user may wish to compare two or more series or other data sets on a differential or marginal basis, to locate components of interest.

Figure 5:
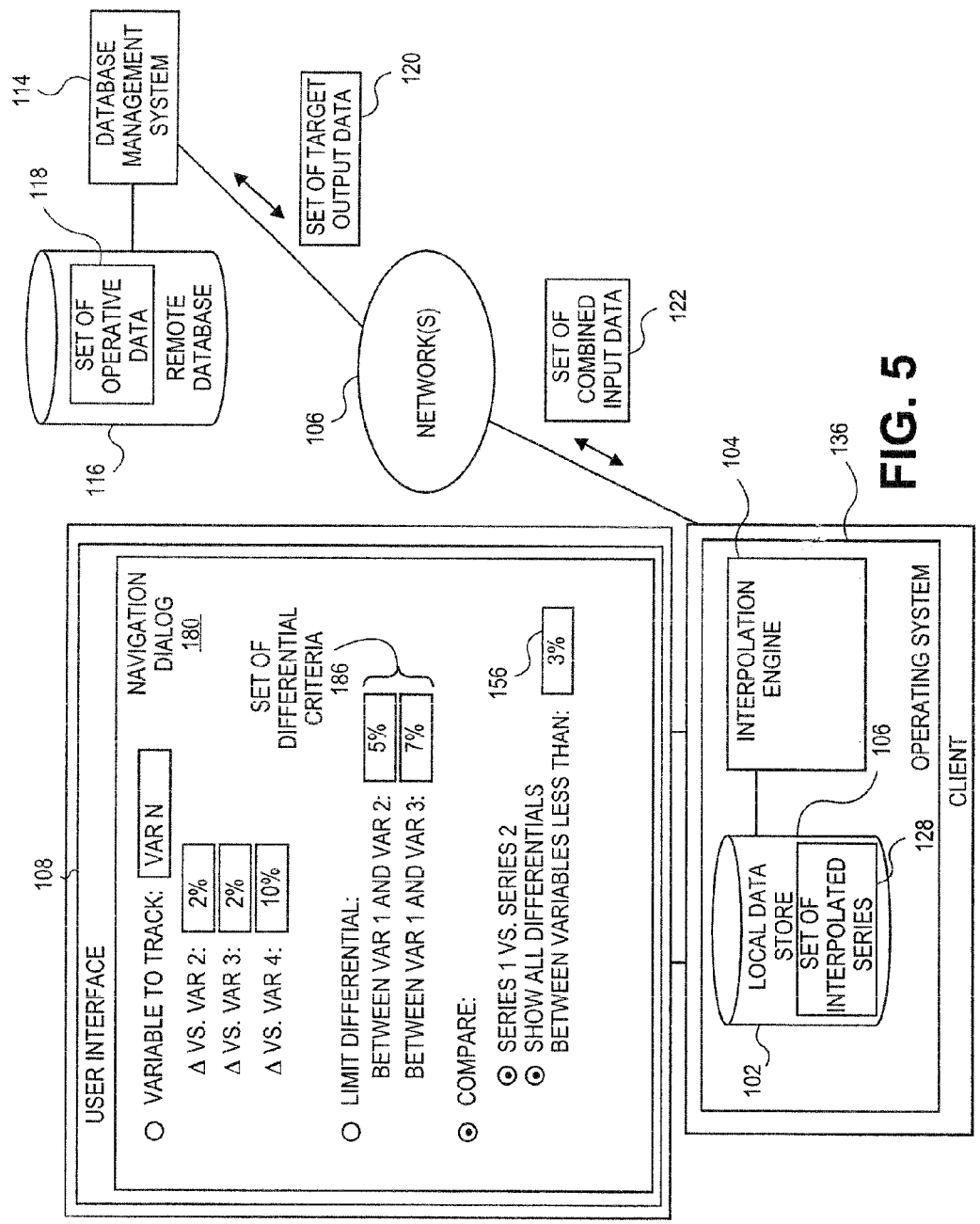
FIG. 5 illustrates an exemplary network configuration that can be used in conjunction with systems and methods for tracking differential changes in conformal data input sets, according to various embodiments of the present teachings.

Consistent with this, more particularly, as for example shown in FIG. 5, in embodiments, the interpolation engine 104 of client 102 can be configured to host, generate, present, and/or otherwise access the navigation dialog 180. In aspects, the navigation dialog 180 can be or include an application, module, service, and/or other logic to receive and process one or more filters, selections, and/or other set of differential criteria 186 that can be applied to predetermined input data and/or other data used in interpolation and/or extrapolation operations, according to the present teachings. In aspects, the interpolation engine 104 and/or other logic can generate or manage the navigation dialog 180 to present to a user of client 102, for instance, via the graphical user interface of client 102 and/or using other interfaces.

According to aspects, the navigation dialog 180 can present the user with a variety of dialog and/or input options, such as radio buttons, input boxes, and/or other gadgets or input mechanisms, to receive data including the set of differential criteria 186. In aspects, the set of differential criteria 186 can be or include a variety of criteria, metrics, and/or conditions that can be used to compare or analyze two or more set of interpolated input data 126 contained in or associated with a set of series of interpolated input data 128 generated by the interpolation engine 104. In aspects, the navigation dialog 180 can include a user-supplied input specifying a marginal deviation in percent, a difference in absolute value, a threshold, a function, a variable, and/or other criteria or decision rules by which two or more series in the set of series of interpolated input data 128 can be analyzed, compared, or selected. The user can thereby use the navigation dialog 180 to track or navigate different series in the set of series of interpolated input data 128 for analytic purposes, including to select optimized, maximized, and/or otherwise best-available data sets for use in interpolation operations.

Figure 6A:
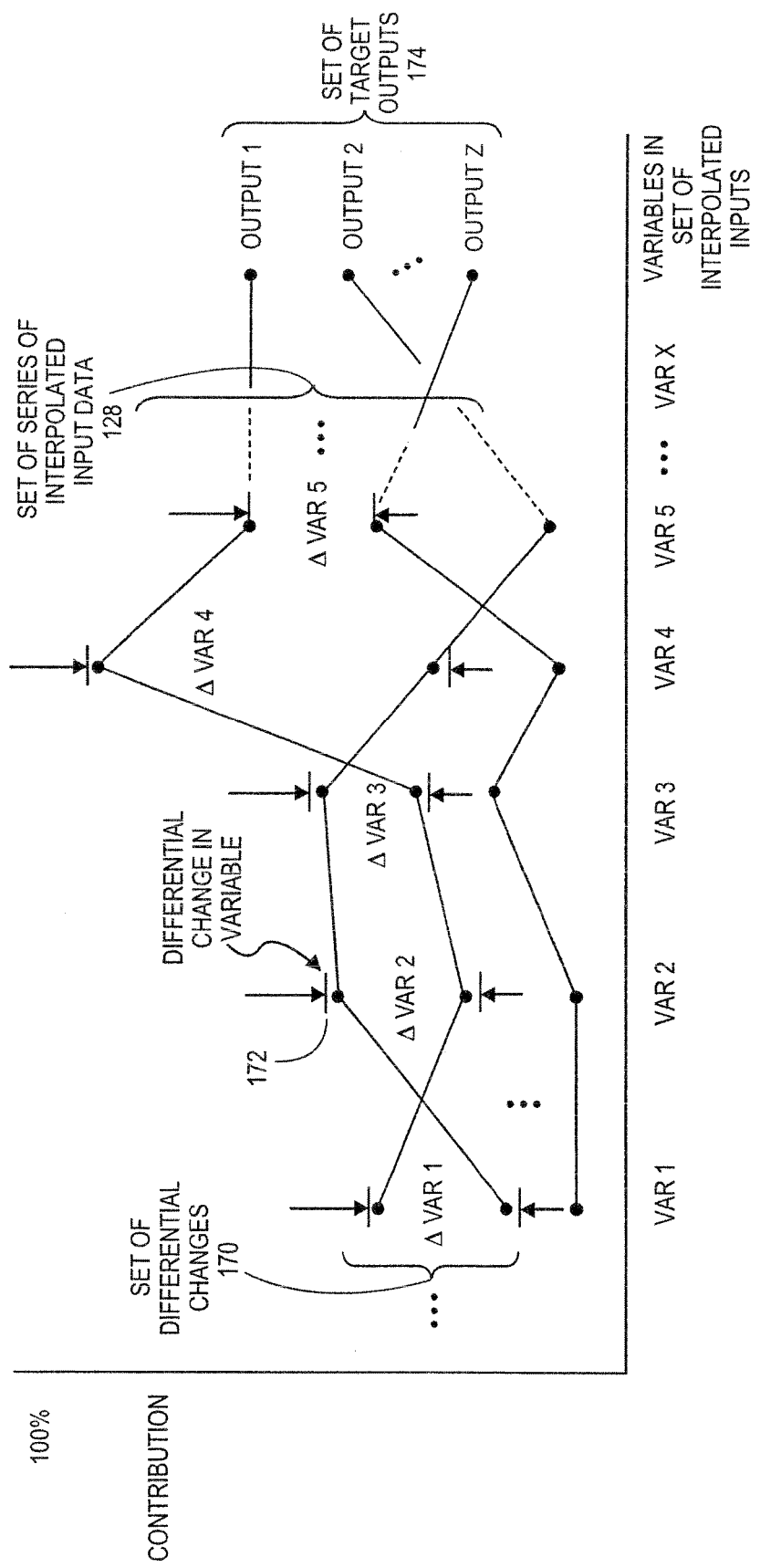
FIGS. 6A and 6B illustrate an exemplary set of series of interpolated input data, along with differential metrics, that can be used in comparative or differential operations in systems and methods for tracking differential changes in conformal data input sets, according to various embodiments.

Consistent with these aspects, and as for instance more particularly shown in FIG. 6A, the set of series of interpolated input data 128 can comprise a set of series of interpolated input data, each series of which contains multiple variables under study or analysis by the interpolation engine 104. In aspects, individual variables in each series in the set of series of interpolated input data 128 can contribute different amounts (shown merely illustratively in percentage terms) to an ultimate output produced by that series and contained in a set of target outputs 174. Thus, in aspects, in an economic analysis, one series in the set of series of interpolated input data 128 can reflect the wholesale prices of gold, silver, copper, and/or other metal for the month of May 2010, while another series can represent that same series of price points for those commodities for the month of June 2010. For each type of metal between those two series in the set of series of interpolated input data 128, each variable can be compared to calculate or generate a differential change in variable 172, the aggregate of which between two or more series can form a set of differential changes 170. In this scenario, the set of target outputs 174 can represent an average "market basket" of metals commodity prices for the subject period, with the set of differential changes 170 representing, to a level, the relative market movement between those prices in the month-to-month time period. In aspects, the set of target outputs 174 can also or instead by generated or specified by the user themselves, for instance, to examine the effects of changes to a single output, such as the same market basket of commodities prices for one month, adjusted up or down by certain marginal amounts. In so doing, the operator can then view the set of interpolated input data 126 corresponding to various hypothetical market price levels, and view the behavior of other quantities or variables.

Figure 6B:
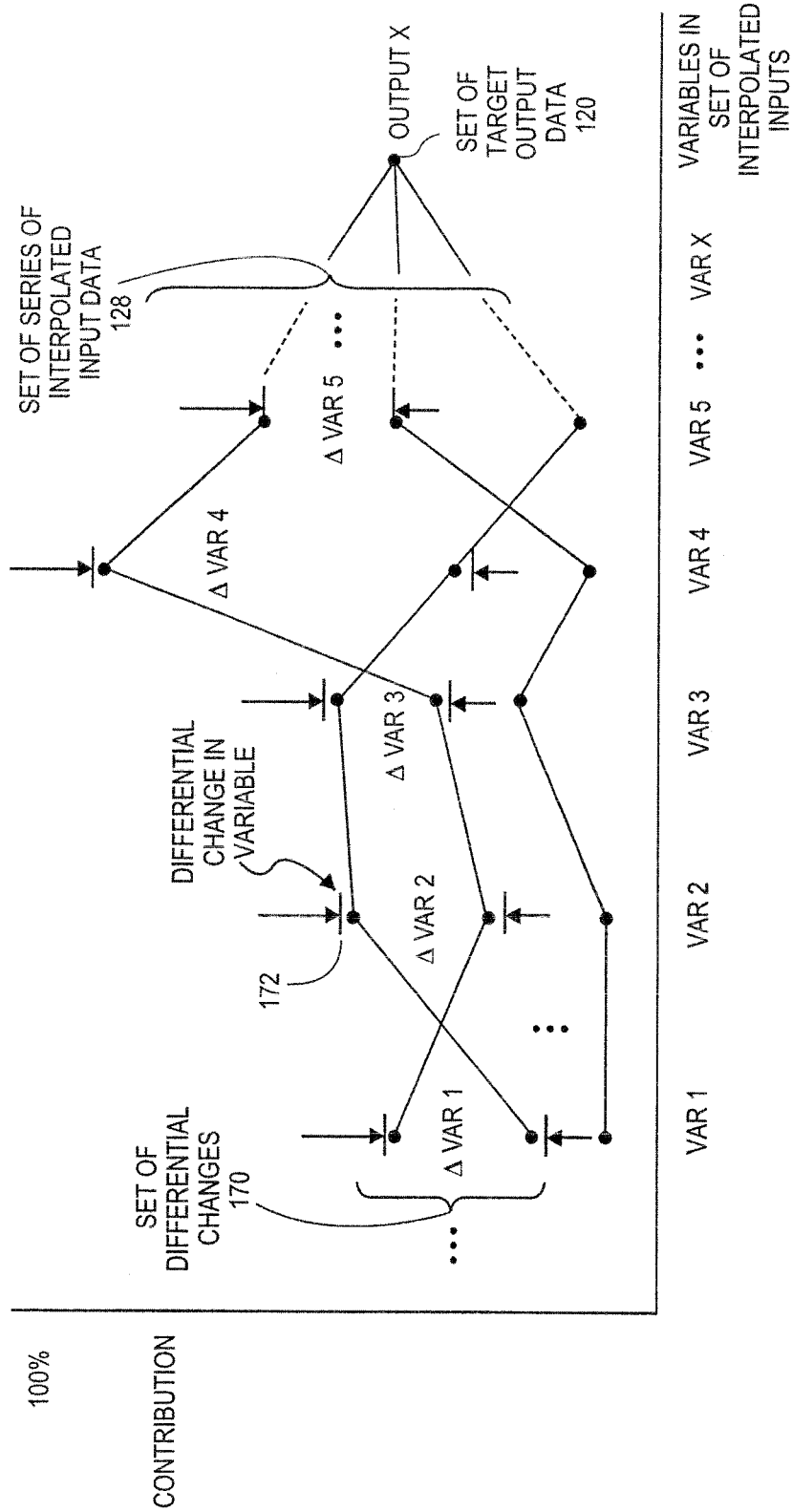

Similarly, in aspects for instance shown in FIG. 6B, the user can also or instead examine a set of series of interpolated input data 128 which consists of a set of series which together combine to generate one set of target output data 120. In such scenarios, the differential change in variable 172 may be fixed or determined by the value of the set of target output data 120, with the set of differential changes 170 thereby representing the margin or differential between various contributing variables and their series. For instance, in cases where the set of target output data 120 represents a measure of Gross Domestic Product (GDP) for a country for one year, one series in the set of series of interpolated input data 128 can represent the contribution of the manufacturing industry on a month-by-month basis, another series in the set of series of interpolated input data 128 can represent the monthly contribution of export activity, another series in the set of series of interpolated input data 128 can represent the monthly contribution of the agricultural sector, and so forth. Other combinations, classes, and types of data in the set of series of interpolated input data 128, set of differential changes 170, one or more differential change in variable 172, and/or other data sets can be used.

In aspects, the generation and capture of the set of differential changes 170 can permit a user of the navigation dialog 180 to navigate the set of differential changes 170, and/or individual differential changes in variable 172, to explore, track, navigate, and/or otherwise analyze the set of combined input data 122 and/or any of its components. For instance, the user can access the set of series of interpolated input data 128 using the navigation dialog 180, and input a set of differential criteria 186 by which to analyze the set of differential changes 170. For instance, the user may specify that the variable of the wholesale price of titanium is to be differentially compared to the wholesale market price of beryllium, and to view only those time periods or results for which the price differential between the two commodities is limited to 4%. In aspects, the operator may for instance set the differential criteria 186 to a value of 100%, and/or set other values or logical flags for variables and/or series which the operator wishes to match or equal each other, or to occupy other relationships to each other. For further instance, the user can operate the navigation dialog 180 to input a set of differential criteria 186 to perform a discovery process to locate all commodity market prices for the year 2009 which deviated or differed by no more than 3%. In aspects, the navigation dialog 180 can present the user with a graphical depiction (such as a graph or the type pictured, and/or others) of those series in the set of series of interpolated input data 128 which meet the set of differential criteria 186. In aspects, the navigation dialog 180 can store, generate, and/or present a collection of such results in a graphical and/or other format, to permit the user for instance to navigate forward and/or backward through those series and/or their graphical or other representations. In aspects, this may permit the operator to obtain a visual "feel" for the nature of the interpolation results, such as, for instance, when a large deviation is presented between a variable contained in two series. Other tracking and navigation operations are possible.

After performing any one or more differential study and/or other operations including the generation of one or more set of series of interpolated input data 128 or set of differential changes 170, and/or updates to that or other data the operator can elect to identify and/or save at least one of the set of series of interpolated input data 128 as a finalized or otherwise stored series. The operator can for example save that series for further analysis or adjustment by additional differential processing, navigation, and/or other operations. Thus for instance, if the operator has determined that the metal commodity demonstrating the most stable price excursions relative to other materials in a given time frame is aluminum, the user may store that series or other data, for example, for use in a commodities fund or other application.

Figure 7:
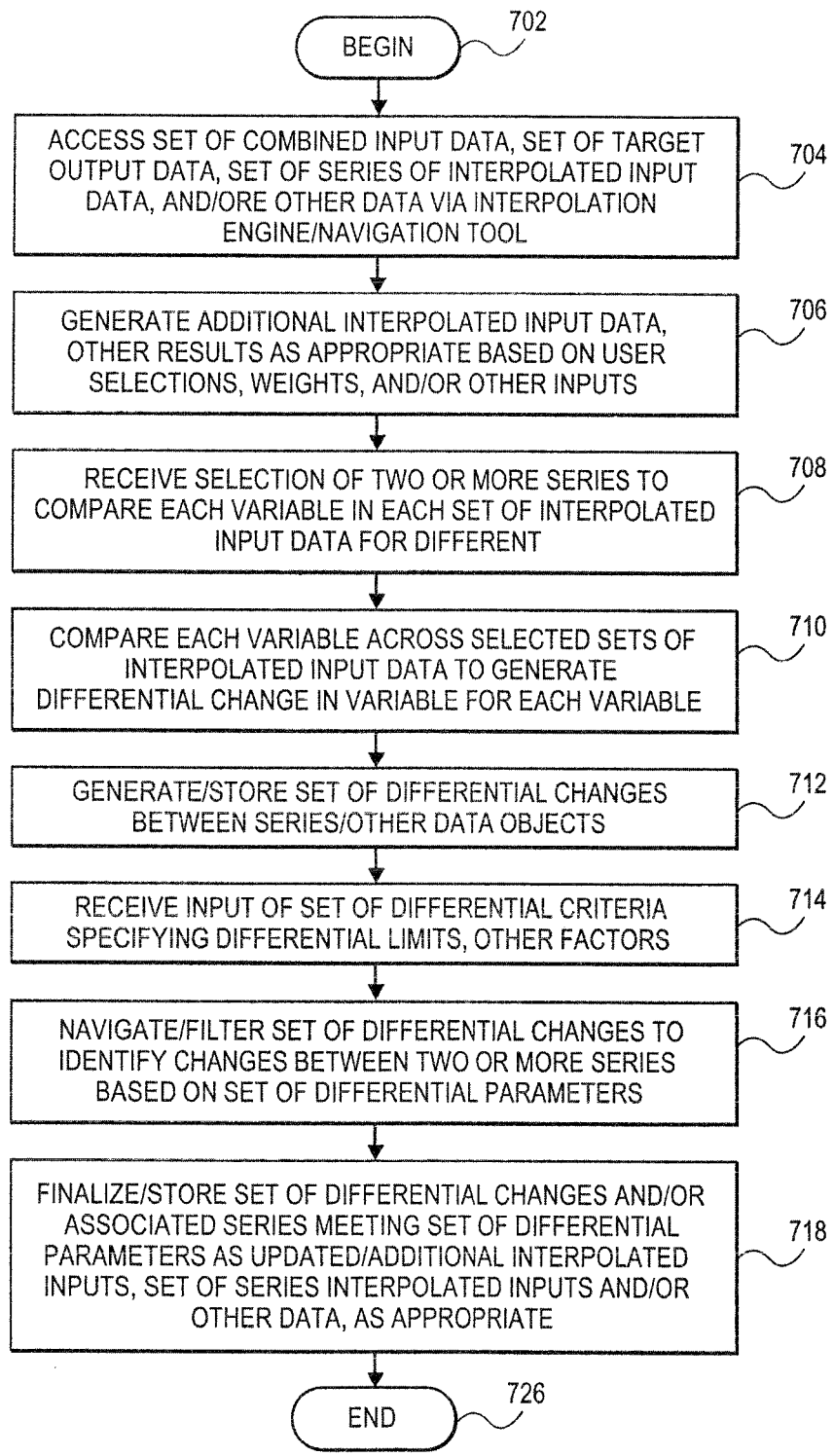
FIG. 7 illustrates a flowchart of exemplary comparative processing and other processing flows that can be used in connection with systems and methods for tracking differential changes in conformal data input sets, according to various embodiments.

FIG. 7 illustrates an illustration of a process flow that can be used in systems and methods for tracking differential changes in conformal data input sets, according to various embodiments. In 702, processing can begin. In 704, an analyst, operator, and/or other user can access the set of combined input data 122, set of target output data 120, the set of series of interpolated input data 128, and/or other data via interpolation engine 104 and/or navigation dialog 180 on the client 102, and/or using other platforms, logic, application, service, and/or interface. In 706, the user can generate additional and/or updated interpolated input data as part of the set of interpolated input data 126, and/or other results, as appropriate, for instance using or based on user input of selections, weights, and/or other inputs. In 708, the interpolation engine 104, navigation dialog 180, and/or other logic can receive a selection of two or more series in the set of series of interpolated input data 128 to compare one or more variables contained in each series of interpolated input data to each other. In 710, the interpolation engine 104, navigation dialog 180, and/or other logic can compare each variable or other data object across the selected sets of series of interpolated input data 128 to generate the differential change in variable 172 for each variable contained in those sets. In aspects, the two variables being compared may have the same name or identify, or can occupy the same ordinal position in their respective sets, and/or can have different names, identifiers, and/or ordinal locations. In 712, the interpolation engine 104, navigation dialog 180, and/or other logic can generate and/or store the set of differential changes 170 between the two selected series in the set of series of interpolated input data 128.

In 714, the interpolation engine 104, navigation dialog 180, and/or other logic can receive an input of the set of differential criteria 186 specifying differential limits and/or other filters, thresholds, functions, and/or factors. In 716, the interpolation engine 104, navigation dialog 180, and/or other logic can navigate and/or filter the set of differential changes 170 to identify changes between two or more series in the set of series of interpolated input data 128 based on or satisfying the set of differential criteria 186. In 718, the interpolation engine 104, navigation dialog 180, and/or other logic can finalize the set of differential changes 170 and/or associated series of interpolated input data meeting the set of differential criteria 186 as updated and/or additional interpolated inputs in the set of interpolated inputs 126, updated and/or additional series in the set of series of interpolated input data 128, as and/or other data types, classes, or categories, as appropriate. In 720, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the interpolation engine 104 comprises a single application or set of hosted logic in one client 102, in embodiments the interpolation and associated logic can be distributed among multiple local or remote clients or systems.

In embodiments, multiple interpolation engines can be used. Similarly, while embodiments have been described in which the set of operative data 118 is accessed via one remote database management system 114 and/or a remote database 116 associated with the remote database management system 114, in embodiments, the set of operative data 118 and associated information can be stored in one or multiple other data stores or resources, including in local data store 138 of client 102. Still further, while embodiments have been described in which the navigation dialog 180 is hosted in or generated by the interpolation engine 104 itself, in embodiments, the navigation dialog 180 can be hosted and/or generated in an additional or different local or remote host machine, logic, and/or service. Other resources described as singular or integrated can in embodiments be plural or distributed, and resources described as multiple or distributed can in embodiments be combined. The scope of the invention is accordingly intended to be limited only by the following claims.

What is claimed:

1. A method comprising:
   receiving, by a processing device, a selection of a first series of interpolated input data and a second series of interpolated input data, wherein the first series of interpolated input data comprises a first set of variables contributing to a first output, and the second series of interpolated input data comprises a second set of variables contributing to a second output;
   determining a differential change between each of the first set of variables of the first series of interpolated input data with a corresponding variable of the second set of variables of the second series of interpolated input data to produce a set of differential changes;
   presenting a visual representation of the set of differential changes in a graphical user interface;
   receiving user input of one or more criteria specifying a threshold to analyze the set of differential changes;
   receiving user input, via the graphical user interface, manipulating one or more values of at least one of the first set of variables or the second set of variables, wherein the manipulating produces adjustments to one or more differential changes in the set of differential changes;
   creating, by the processing device, an updated visual representation in the graphical user interface to present an alternate data set for at least one of the first series of interpolated input data and the second series of interpolated input data in view of the adjustments to the one or more differential changes; and
   receiving, by the processing device, a user selection, via the graphical user interface, of the adjustments to the one or more differential changes as finalized adjustments, and a user selection of at least one of the first series of interpolated input data or the second series of interpolated input data presented in the updated visual representation as a finalized series of interpolated input data, wherein the finalized adjustments and the finalized series satisfy the one or more criteria.

2. The method of claim 1, wherein the criteria comprises a maximum percentage deviation between a value of one of the interpolated values for the first series of interpolated input data with a value of one of the interpolated values for the second series of interpolated input data.

3. The method of claim 1, wherein the criteria comprises a minimum percentage deviation between a value of one of the interpolated values for the first of series of interpolated input data with a value of one of the interpolated values for the second series of interpolated input data.

4. The method of claim 1, further comprising:
   receiving user input specifying a percentage; and
   presenting in the updated visual representation the one or more interpolated inputs in the first series of interpolated input data and the second series of interpolated input data that have a corresponding differential change that is within the percentage without presenting other interpolated inputs of the first series of interpolated input data and the second series of interpolated input data that have a corresponding differential change that is not within the percentage.

5. The method of claim 1, wherein the first set of variables of the first series of interpolated input data and the second set of variables of the second series of interpolated input data are combined to generate a single set of target output data.

6. The method of claim 1, further comprising storing the finalized adjustments and the finalized series in a data store.

7. The method of claim 1, wherein the first series of interpolated input data and the second series of interpolated input data comprise at least one of a set of financial data, a set of medical data, a set of demographic data, a set of engineering data, a set of network operations data, or a set of geographic data.

8. A system comprising:
   a memory to store a first series of interpolated input data and a second series of interpolated input data, wherein the first series of interpolated input data comprises a first set of variables contributing to a first output, and the second series of interpolated input data comprises a second set of variables contributing to a second output; and
   a processing device, operatively coupled to the memory, to:
      receive a selection of the first series of interpolated input data and the second series of interpolated input data;
      determine a differential change between each of the first set of variables of the first series of interpolated input data with a corresponding variable of the second set of variables of the second series of interpolated input data to produce a set of differential changes;
      present a visual representation of the set of differential changes in a graphical user interface;
      receive user input of one or more criteria specifying a threshold to analyze the set of differential changes,
      receiving user input, via the graphical user interface, manipulating one or more values of at least one of the first set of variables or the second set of variables, wherein the manipulating produces adjustments to one or more differential changes in the set of differential changes;
      create an updated visual representation in the graphical user interface to present an alternate data set for at least one of the first series of interpolated input data and the second series of interpolated input data in view of the adjustments to the one or more differential changes; and
      receive a user selection, via the graphical user interface, of the adjustments to the one or more differential changes as finalized adjustments, and a user selection of at least one of the first series of interpolated input data or the second series of interpolated input data presented in the updated visual representation as a finalized series of interpolated input data, wherein the finalized adjustments and the finalized series satisfy the one or more criteria.

9. The system of claim 8, wherein the criteria comprises a maximum percentage deviation between a value of one of the interpolated values for the first series of interpolated input data with a value of one of the interpolated values for the second series of interpolated input data.

10. The system of claim 8, wherein the criteria comprises a minimum percentage deviation between a value of one of the interpolated values for the first series of interpolated input data with a value of one of the interpolated values for the second series of interpolated input data.

11. The system of claim 8, wherein the processing device is further to:
receive user input specifying a percentage; and
present in the updated visual representation the one or more interpolated inputs in the first series of interpolated input data and the second series of interpolated input data that have a corresponding differential change that is within the percentage without presenting other interpolated inputs of the first series of interpolated input data and the second series of interpolated input data that have a corresponding differential change that is not within the percentage.

12. The system of claim 8, wherein the first set of variables of the first series of interpolated input data and the second set of variables of the series of interpolated input data are combined to generate a single set of target output data.

13. The system of claim 8, wherein the processing device is further to store the finalized adjustments and the finalized series in a data store.

14. The system of claim 8, wherein the first series input data and the second series of interpolated input data comprise at least one of a set of financial data, a set of medical data, a set of demographic data, a set of engineering data, a set of network operations data, or a set of geographic data.

15. A non-transitory computer-readable medium having instructions encoded thereon which, when executed by a processing device, cause the processing device to:
receive, by the processing device, a selection of a first series of interpolated input data and a second series of interpolated input data, wherein the first series of interpolated input data comprises a first set of variables contributing to a first output, and the second series of interpolated input data comprises a second set of variables contributing to a second output;
determine a differential change between each of the first set of variables of the first series of interpolated input data with a corresponding variable of the second set of variables of the second series of interpolated input data to produce a set of differential changes;
present a visual representation of the set of differential changes in a graphical user interface;
receive user input of one or more criteria specifying a threshold to analyze the set of differential changes;
receiving user input, via the graphical user interface, manipulating one or more values of at least one of the first set of variables or the second set of variables, wherein the manipulating produces adjustments to one or more differential changes in the set of differential changes;
create, by the processing device, an updated visual representation in the graphical user interface to present an alternate data set for at least one of the first series of interpolated input data and the second series of interpolated input data in view of the adjustments to the one or more differential changes; and
receive, by the processing device, a user selection, via the graphical user interface, of the adjustments to the one or more differential changes as finalized adjustments, and a user selection of at least one of the first series of interpolated input data or the second series of interpolated input data presented in the updated visual representation as a finalized series of interpolated input data, wherein the finalized adjustments and the finalized series satisfy the one or more criteria.

16. The non-transitory computer-readable medium of claim 15, wherein the criteria comprises a maximum percentage deviation or a minimum percentage deviation between a value of one of the interpolated values for the first series of interpolated input data with a value of one of the interpolated values for the second series of interpolated input data.

17. The non-transitory computer-readable medium of claim 15, wherein the first set of variables of the first series of interpolated input data and the second set of variables of the second series of interpolated input data are combined to generate a single set of target output data.

18. The non-transitory computer-readable medium of claim 15, wherein the processing device is further to store the finalized adjustments and the finalized series in a data store.

19. The non-transitory computer-readable medium of claim 15, wherein the first series of interpolated input data and the second series of interpolated input data comprise at least one of a set of financial data, a set of medical data, a set of demographic data, a set of engineering data, a set of network operations data, or a set of geographic data.

20. The non-transitory computer-readable medium of claim 15, wherein the processing device is further to:
receive user input specifying a percentage; and
present in the updated visual representation the one or more interpolated inputs in the first series of interpolated input data and the second series of interpolated input data that have a corresponding differential change that is within the percentage without presenting other interpolated inputs of the first series of interpolated input data and the second series of interpolated input data that have a corresponding differential change that is not within the percentage.

* * * * *